Oct. 6, 1964 H. B. ANDERSON 3,152,238
ELECTRON BEAM CENTERING APPARATUS
Filed May 11, 1962

INVENTOR
HARRY B. ANDERSON
BY
AGENT

United States Patent Office 3,152,238
Patented Oct. 6, 1964

3,152,238
ELECTRON BEAM CENTERING APPARATUS
Harry B. Anderson, Wapping, Conn., assignor to United Aircraft Corporation, East Hartford, Conn., a corporation of Delaware
Filed May 11, 1962, Ser. No. 194,086
5 Claims. (Cl. 219—121)

My invention relates to working materials with an intense beam of charged particles. More particularly, my invention relates to a method and apparatus for centering an electron beam in an apparatus which uses such beam to perform various operations on any material.

Electron beam machines, as they are generally known, are devices which use the kinetic energy of an electron beam to work a material. U.S. Patent No. 2,944,172, issued July 5, 1960, to W. Opitz et al., discloses such a machine. These machines operate by generating a highly focused beam of electrons. The electron beam is a welding, cutting, and machining tool which has practically no mass but has high kinetic energy because of the extremely high velocity imparted to the electrons. Transfer of this kinetic energy to the lattice electrons of the work piece generates higher lattice vibrations which cause an increase in the temperature within the impingement area sufficient to accomplish work.

In the use of electron beam machines, considerable inconvenience is experienced in centering the beam for initial set-up at the start of each cutting or welding sequence. This centering operation is necessary to align the electron optical and visio-optical axes of the machine to permit subsequent placement of the work piece. Prior to my invention, beam centering was a time consuming process. The most common prior art method of centering the electron beam consisted of positioning a suitable target, such as a tungsten disc, under the beam at the same height at which work was to be performed. The beam was then allowed to impinge on this tungsten disc while the point of impingement was observed visually through an optical system comprising a microscope. The target, being tungsten, would glow at the point where the electron beam impinged thereon and the beam could thus be centered by observing the glowing spot while adjusting the machine's deflection coil voltages. As mentioned above, this process is very time consuming, particularly since once the beam has been centered the target must be removed and the work piece positioned at the proper point in the machine's work chamber. For a large work piece, this would mean opening the chamber to insert the piece and thereafter pumping the chamber down to the required degree of vacuum before beginning the operation on the piece.

My invention overcomes the above disadvantages by providing a novel method and apparatus for centering an intense beam of charged particles.

It is, therefore, an object of my invention to center a beam of charged particles.

It is another object of my invention to center a beam of charged particles rapidly and accurately.

It is also an object of my invention to automatically center a beam of charged particles.

It is another object of my invention to center a beam of charged particles by sensing, at a plurality of points, the magnetic field generated by said beam.

It is still another object of my invention to center a beam of charged particles and thereafter provide an indication of any deviation of the beam from said centered position.

It is a further object of my invention to obtain an accurate and repeatable initial impingement point for a beam of charged particles.

These and other objects of my invention are accomplished by sensing the alternating magnetic field surrounding a pulsed beam of charged particles, and using indications of field strength at a plurality of points to generate control signals which may be used to center the beam. Specifically, my invention contemplates mounting four small search coils around a beam of charged particles in such a manner that the plane of the coils lies parallel to quadrant radial lines emanating from the beam. When the beam is pulsed, a voltage will be induced in the coils which is a measure of their distance from the beam axis. These voltages are then amplified and compared and, if a difference exists between the voltages induced in two diametrically opposed coils, a command may be given to cause the beam to return to its center or zero position. The beam may be centered by means of a position servo system, or the operator may manually adjust the beam deflection to obtain a zero or null meter indication.

My invention may be better understood and its numerous advantages will become apparent to those skilled in the art from the following disclosure taken together with the accompanying drawing wherein like reference numerals refer to like elements in the figures and in which.

Figure 1:
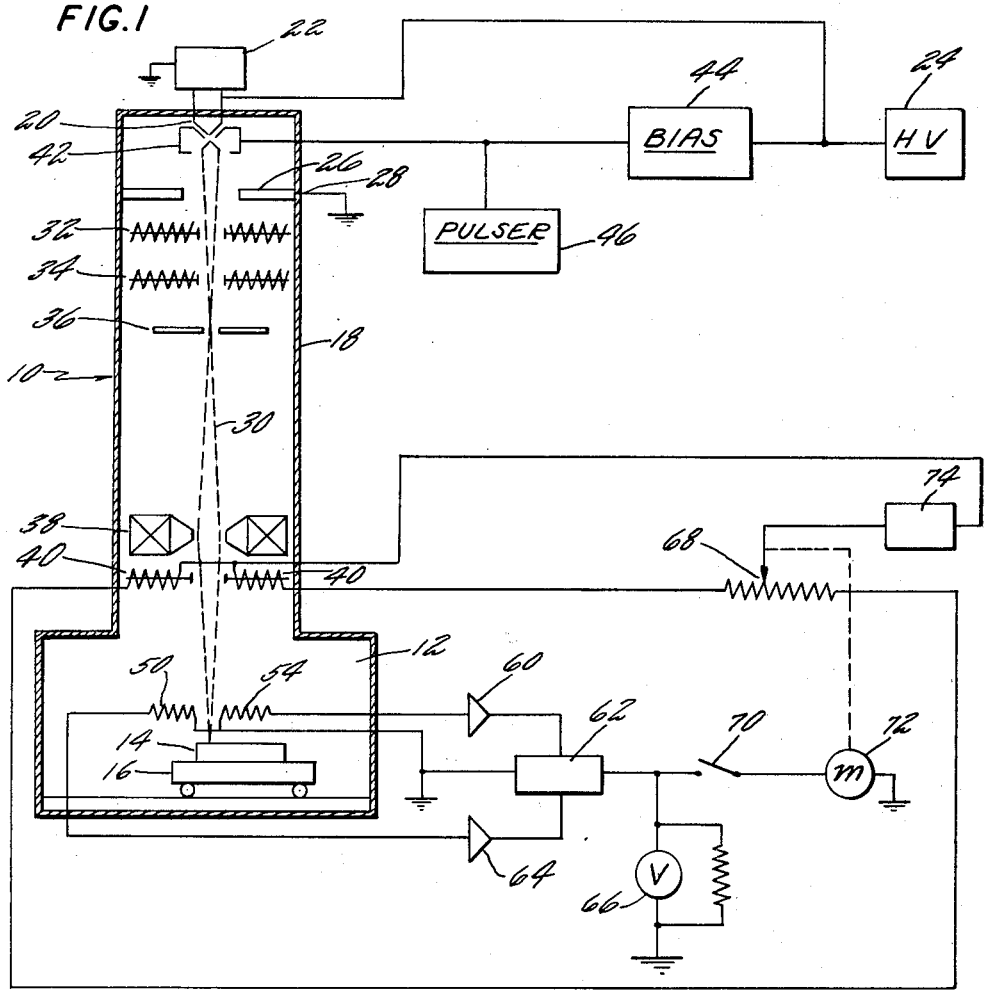
FIGURE 1 is a schematic view of an electron beam machine employing my invention.

Referring now to FIGURE 1, an electron beam machine is indicated generally at 10. The machine comprises a vacuum chamber 12 containing a work piece 14 positioned on a movable table 16. The machine also comprises an electron beam column 18 containing a source of electrons, beam forming means and beam focusing means. The source of electrons comprises a directly heated cathode or filament 20 which is supplied with heating current from a filament voltage supply 22. A negative accelerating voltage is supplied to the cathode 20 from a high voltage supply 24. An apertured anode 26 is positioned in the electron beam column 18 between the cathode and the work piece. The anode is connected to the case of the machine which is grounded at 28. The difference in potential between the cathode 20 and anode 26 causes electrons emitted from the cathode to be accelerated down column 18. The electrons are focused into a beam, indicated generally at 30 by an electron optical system comprising adjustment coils 23 and 34, diaphragm 36 and magnetic lens 38.

The beam impinges on work piece 14 where it gives up kinetic energy in the form of heat. The work piece 14 may be moved beneath the beam by a movable table 16 and the beam may be deflected over the work piece by means of deflection coils 40. Positioned adjacent cathode 20 is a control electrode 42. This control electrode is normally at a voltage which is more negative than the voltage applied to the cathode. The magnitude of this bias or voltage difference is controlled by bias voltage control 44. The control electrode, while aiding in the focusing of the beam, performs the same function as the grid in an ordinary triode vacuum tube. Also connected to the control electrode 42 is a pulse generator 46 which produces control pulses which are superimposed on the control electrode bias voltage. By proper selection of the bias voltage and the magnitude of the positive pulses generated by pulser 46, electrons will be accelerated down column 18 in synchronism with the control pulses.

Figure 2:
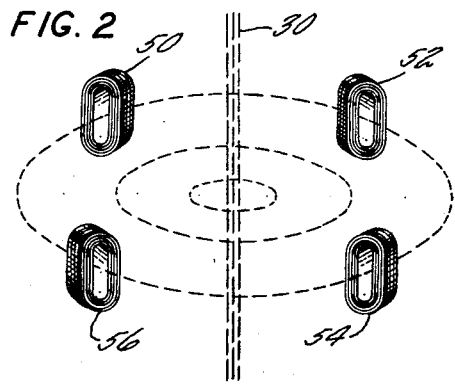
FIGURE 2 is an enlarged isometric view of the search coils which may be utilized in my invention.

When the pulsed beam is accelerated down column 18, an alternating magnetic field will be generated in the same manner as a field is generated by pulsing the current flow in a conductor. Adjacent the workpeice 14, four small search coils, 50, 52, 54 and 56, are mounted around the beam in such a manner that the plane of the coils lies parallel to quadrant radial lines emanating from the beam. Only two of these coils 50 and 54 are shown in FIGURE 1, while FIGURE 2 shows all four coils in their proper relationship to each other and to the beam. When the pulsed beam passes between these coils, magnetic lines of flux will intersect the coils. Since the beam is pulsed, the magnetic field generated thereby is alternating and, therefore, the expanding and collapsing flux lines will generate voltages in the coils the magnitudes of which are measures of their individual distances from the beam axis.

As shown in FIGURE 1, the voltages induced in two diametrically opposed coils 50 and 54 are amplified in amplifiers 60 and 64 respectively, and then compared in a voltage comparator 62. The difference voltage from comparator 62 is applied to voltmeter 66. By observing meter 66, which may be calibrated in terms of distance from center position, the operator can manually center the beam by adjusting deflection voltage control potentiometer 68. Meter 66 could, of course, be connected between the outputs of amplifiers 60 and 64 to also give a "left-right" indication.

If it is desired to have the beam centered automatically, switch 70 may be closed. This will cause the difference voltage from comparator 62 to be applied to servo motor 72. The output shaft of servo motor 72 is coupled to deflection voltage control 68 which adjusts the voltage supplied to deflection coils 40 from deflection voltage supply 74. It is, of course, understood that another circuit identical to that provided for search coils 50 and 54 must be provided for search coils 50 and 56 in order to control the deflection voltage to a second pair of deflection coils which would be located at right angles to deflection coils 40.

While the preferred embodiment of my invention has been shown and disclosed, various modifications and substitutions may be made without deviating from the scope and spirit thereof. For example, if it is desired to begin work at a point other than the beam centered position, the beam may be adjusted initially to such other point while observing the meters associated with each pair of search coils. Also, should it be desired to automate the process, the output of a programming means may be compared with the output of voltage comparator 62 and the difference therebetween used to automatically control deflection of the beam to preselected points. Similarly, synchronism between movement of table 16 and the beam position may be provided. It is also to be understood that pulsing of the beam is necessary only during the centering operation and thereafter the work may be done with a steady beam.

Thus my invention has been described by way of illustration rather than limitation and accordingly it is understood that my invention is to be limited only by the appended claims taken in view of the prior art.

I claim:
1. An electron beam welding and cutting machine comprising:
   means for producing a beam of electrons,
   means for focusing said beam on a work piece,
   means for interrupting said beam, and
   means responsive to the magnetic field generated by said interrupted beam for producing an indication of beam location.
2. The apparatus of claim 1 wherein the means for producing an indication of beam location comprises:
   a plurality of magnetic field sensing elements, and
   means responsive to signals produced by said sensing elements for indicating beam location.
3. The apparatus of claim 2 wherein the plurality of magnetic field sensing elements comprises two pairs of diametrically opposed search coils located in a plane perpendicular to the beam axis.
4. The apparatus of claim 3 wherein the indicating means comprises a pair of voltage comparators each connected between two diametrically opposed search coils for generating difference voltages indicative of beam deviation from its centered position.
5. The apparatus of claim 4 further comprising:
   means responsive to difference voltages generated by said comparators for varying the beam deflection.

References Cited in the file of this patent
UNITED STATES PATENTS

| | | |
|---|---|---|
| 1,980,100 | Schlumberger | Nov. 6, 1934 |
| 2,640,948 | Burrill | June 2, 1953 |
| 2,944,172 | Opitz et al. | July 5, 1960 |